(12) United States Patent
Doak et al.

(10) Patent No.: US 6,758,883 B2
(45) Date of Patent: Jul. 6, 2004

(54) APPARATUS AND METHOD FOR DECREASING WATER VAPOR IN COMPRESSED GAS

(76) Inventors: George William Doak, P.O. Box 70222, Grand Terrace, CA (US) 92167-1222; Kenneth William Doak, P.O. Box 70222, San Diego, CA (US) 92167-1222

( * ) Notice: Subject to any disclaimer, the term of this patent is extended or adjusted under 35 U.S.C. 154(b) by 0 days.

(21) Appl. No.: 10/254,421

(22) Filed: Sep. 23, 2002

(65) Prior Publication Data

US 2004/0055466 A1 Mar. 25, 2004

(51) Int. Cl.[7] .............................................. B01D 45/06
(52) U.S. Cl. .............................. 95/267; 55/462; 55/464; 55/DIG. 15; 55/DIG. 17
(58) Field of Search ........................... 55/462, 464, 465, 55/DIG. 15, DIG. 17; 95/267

(56) References Cited

U.S. PATENT DOCUMENTS

| | | | | | |
|---|---|---|---|---|---|
| 151,279 | A | * | 5/1874 | Egar ............................ | 55/462 |
| 221,553 | A | * | 11/1879 | Hawksworth ................. | 55/462 |
| 468,169 | A | * | 2/1892 | Cooper ......................... | 55/428 |
| 663,099 | A | * | 12/1900 | Reynolds ...................... | 96/409 |
| 791,773 | A | * | 6/1905 | Greenaway .................... | 55/444 |
| 1,773,073 | A | * | 8/1930 | Beach .......................... | 55/441 |
| 2,948,351 | A | * | 8/1960 | Phillips et al. ................. | 96/176 |
| 3,957,465 | A | * | 5/1976 | Pircon .......................... | 95/221 |
| 4,036,609 | A | * | 7/1977 | Pircon .......................... | 95/218 |
| 4,242,111 | A | * | 12/1980 | Arends et al. ............. | 55/315.2 |
| 4,326,856 | A | * | 4/1982 | Muenger et al. ........... | 48/197 R |
| 4,668,252 | A | * | 5/1987 | Gerdau ......................... | 96/189 |
| 6,167,956 | B1 | | 1/2001 | Bostedo et al. .............. | 165/284 |
| 6,241,793 | B1 | * | 6/2001 | Lee et al. ................... | 55/434.2 |
| 6,258,153 | B1 | * | 7/2001 | Hintermaier ................. | 95/267 |
| 6,370,887 | B1 | | 4/2002 | Hachimaki ..................... | 62/94 |
| 6,394,758 | B1 | | 5/2002 | Lee et al. ...................... | 417/13 |
| 2002/0162773 | A1 | * | 11/2002 | Kim et al. .................... | 209/143 |

FOREIGN PATENT DOCUMENTS

JP          61-216710        * 9/1986  ................... 55/465

OTHER PUBLICATIONS

Hankison International, About Compressed Air Treatment, printout dated Apr. 24, 2002 (original publication date unknown), internet website pages from http://www.hankisonintl.com.

Ingersoll–Rand–Air Solutions Group, Common Sense of Compressor Air System Maintenance, printout dated Apr. 24, 2002 (original publication date unknown), internet website pages from http://www.air.ingersoll-rand.com/AST/common.htm.

(List continued on next page.)

Primary Examiner—Richard L. Chiesa
(74) Attorney, Agent, or Firm—Henderson & Caverly LLP; Kirsten E. Caverly

(57) ABSTRACT

An apparatus for decreasing water vapor in a compressed gas, such as compressed air, using cooling. A pipe, tapered or not, is attached to the air inlet port of the main gas compressor tank, or in a secondary tank or other downstream device, such that the compressed gas is forced through the pipe and onto a heat conductive plate, where water vapor condenses and is drained away.

11 Claims, 3 Drawing Sheets

OTHER PUBLICATIONS

Breen, Michael W., Auxillary Equipment—Air Compressors, Modern Applications News, Preventive Maintenance, Jan. 2002, internet website pages from http://www.modernapplicationsnews.com/articles/m0102preventive_maint.htm.

MSC Industrial Supply Co., Air Dryers & Aftercoolers, excerpt from on–line product catalog, p. 3615, printed from internet website at http://www.mscdirect.com on or about Jul. 24, 2002, (original publication date unknown).

R.P. Adams Company Inc., Aftercoolers, Water Cooled Aftercoolers for Consistent Performance, printout dated Jul. 24, 2002 (original publication date unknown), internet website pages from http://www.rpadams.com/aftercooler.htm.

Compressorworld, LLC, Catalog of Air Dryers: Water Cooled After Coolers, printout dated Jul. 25, 2002 (original publication date unknown), internet website page from http://www.compressorworld.com.

Suburban Manufacturing, Inc., Astrocooler™ Compressor Aftercooler, Why Do You Need A Moisture Control System On Your Compressor?, printout dated Jul. 24, 2002 (original publication unknown), internet website pages from http://www.gosuburban.com/autoastro.html.

Compressorworld, LLC, Catalog of Air Dryers: Air Cooled After Coolers, printout dated Jul. 25, 2002 (original publication date unknown), internet website page from http://www.compressorworld.com.

Bryan, Ricky, Air Dryer Cuts Downtime, Aids Precision, Machine Shop Guide Web Archive, Jun. 1999, printed from internet website at http://www.machineshopguide.com/pdf/699/Airdryercuts.pdf.

Flair Corporation, Brochure for Mist Eliminator, Mar. 2001, printed from internet website at http://www.condit company.com/pdf/ffa_mist.pdf on or about Jul. 24, 2002.

Sentry Filters, Brochure for Sentry Mist Eliminators, The Sentry Solution for Compressed Air, printed from internet website at http://www.SentryFilters.com on or about Jul. 24, 2002 (original publication date unknown).

Compressed Air Services, Inc., Used Air Compressors, Series 12, printout dated Jul. 24, 2002 (original publication date unknown), internet website page from http://www.securityblvd.com/usedaircompressors/.

Airmax, Inc., Compressed Air Support Products, Desiccant Air Dryer, printout dated Jul. 24, 2002 (original publication date unknown), internet website pages from http://www.airmaxproducts.com/desiccant.htm.

Hankison International, Brochure for HDF Series Desiccant Compressed Air Drying System, printed from internet website at http://www.hankisonintl.com on or about Jul. 24, 2002 (original publication date unknown).

Sharpe Manufacturing Company, Dryaire™ Desiccant Air Drying System, printout dated Jul. 25, 2002 (original publication date unknown), internet website pages from http://www.sharpe1.com/6760.htm.

Compressorworld, LLC, Catalog of Air Dryers: Heat Reactivated Desiccant Air Dryers, printout dated Jul. 25, 2002 (original publication date unknown), internet website pages from http://www.compressorworld.com.

Compressorworld, LLC, Catalog of Air Dryers: Blower Purge Desiccant Dryers, printout dated Jul. 25, 2002 (original publication date unknown), internet website pages from http://www.compressorworld.com.

Compressorworld, LLC, Catalog of Air Dryers: Heatless Desiccant Dryers, printout dated Jul. 25, 2002 (original publication date unknown), internet website pages from http://www.compressorworld.com.

Sharpe Manufacturing Company, Dryaire™ Membrane Air Drying System, printout dated Jul. 25, 2002 (original publication date unknown), internet website page from http://www.sharpe1.com/6760.htm.

Hankison International, Brochure for New HMD Series Membrane Dryers, printed from internet website at http://www.hankisonintl.com on or about Jul. 24, 2002 (original publication date unknown).

Praxair Technology, Inc., Technical Bulletin for Membrane Compressed Air Dryer, printed from internet website at http://www.praxair.com on or about Jul. 24, 2002 (original publication date unknown).

Hankison International, Brochure for HEDS Drying Systems, printed from internet website at http://www.hankisonintl.com on or about Jul. 24, 2002 (original publication date unknown).

Compressorworld, LLC, Catalog of Air Dryers: High Temp. Refrigerated Air Dryers, printout dated Jul. 25, 2002 (original publication data unknown), internet website pages from http://www.compressorworld.com.

Compressorworld, LLC, Catalog of Air Dryers: Refrigerated Dryers, printout dated Jul. 25, 2002 (original publication date unknown), internet website pages from http://www.compressorworld.com.

Benz Compressed Air Systems, Inc., Atlas Copco DD, DDp, PD, QD Compressed Air Filters, printouts dated Jul. 24, 2002 (original publication date unknown), internet website pages from http://www.aircompressorequipment.com/atlas--copco-compressed-air-filters.htm.

Trident Compressed Air LTD., Domnick Hunter Oil–X Filters, printout dated Jul. 24, 2002 (original publication date unknown), internet website page from http://www.trident.on.ca/domnick-hunter-oil-x-filters.htm.

Gulf Atlantic Equipment Company, Hankison International Membrane & Desiccant Dryers, HF Series Compressed Air Filters and Grade 9 Separator/Filter, printouts dated Jul. 24, 2002 (original publication date unknown), internet website pages from http://www.gaeicc.com.

Simair Graphics Equipment Limited, Air Sources, printout dated Jul. 25, 2002 (original publication date unknown), internet website pages from http://www.simair.co.uk/compressor.htm.

* cited by examiner

APPARATUS AND METHOD FOR DECREASING WATER VAPOR IN COMPRESSED GAS

FIELD OF THE INVENTION

The present invention relates in general to gas compressors and, more particularly, to devices designed to extract water vapor from the compressed gas, such as by condensing the water vapor contained in the compressed gas by using a cooling effect.

BACKGROUND OF THE INVENTION

Gas compressor systems, such as air compressors, are widely employed in construction, painting, and mechanical industries and for home use. Compressed gasses, such as air, are used in pneumatic and air handling devices and are stored, such as for use in breathing apparatus.

It is well understood that the relative amount of moisture that a gas is capable of carrying in vapor form varies directly with respect to the temperature of the gas and inversely with respect to the pressure of the gas. Compressing a gas typically raises its temperature; allowing a gas to expand typically lowers its temperature. Gas compressors, such as industrial air compressors, raise the temperature of the air during compression and also raise, of course, the pressure of the air. The rise in the temperature of the air due to compression results in increasing its vapor carrying capacity, typically more than is offset by the effect of the pressure increase (which tends to decrease its vapor carrying capacity). This phenomenon results in substantially all of the original water content of the air remaining suspended in vapor form at the elevated pressure and temperature.

If such moisture laden compressed air is introduced immediately into a downstream pneumatic or air handling or storage device, it will cool toward the ambient temperature and eventually lose its ability to carry such a high water content suspended as vapor. Condensation then will form along all of the components receiving compressed air therefrom.

Many components of devices that operate using or are filled with compressed air are sensitive to water vapor and can be damaged by condensation. To avoid this damage, the water vapor content of the compressed gas must be reduced prior to use.

There are many air-water separation devices commercially available to deal with the problem of water vapor in compressed gas. These devices decrease the water vapor content of compressed gasses before the gas enters the downstream pneumatic or air handling device or components. Air-water separation devices are known by such names as "aftercoolers," "intercoolers," "mist eliminators," "dehumidifiers," and "air dryers."

Some vapor elimination devices operate by cooling the compressed air, such as through use of refrigerants, water, or contact with heat conductive metals. Decreases in temperature can be achieved by forcing a high-pressure gas through a constriction, such as a partially opened valve (a "throttle"). This result is known as the Joule-Thomson effect. Other air-water separators use mechanical filters, desiccants, and/or a combination of the above methods. These commercially available drying devices can be integrated into the primary compressor tank, into a secondary cooling tank, or located between the compressor tank(s) and a downstream container or pneumatic device.

One known approach for cooling the compressed air prior to introducing it into the pneumatic system utilizes a length of metal pipe normally with fins or projections to aide in heat dissipation. However, this arrangement may fail to cool the compressed gas sufficiently to provide adequate removal of suspended water vapor and draining off of the condensed water vapor can be problematic.

One example of an aftercooler including a radiator unit can be found in U.S. Pat. No. 6,167,956, which is incorporated by reference as though set forth in full herein. An example of a compressed air dehumidifier can be found in U.S. Pat. No. 6,370,887, which is incorporated by reference as though set forth in full herein. Another known vapor elimination device is an aftercooler manufactured by R. P. Adams Co., Inc. under the trade name ADAMS, which uses water cooling to cool air or gas streams. A known aftercooler using air cooling is manufactured under the trade name ASTROCOOLER®.

A known air dryer is manufactured by Loecy Precision Mfg. and uses a membrane filter to reduce water vapor in the target compressed gases. Another known membrane air dryer, which also includes a silica gel desiccant, is manufactured by Sharpe manufacturing Company and sold under the trade name DRYAIRE™.

Another example of a known desiccant air dryer is manufactured under the trade name ASTURO™. Hankison International, a division of Hansen, Inc., manufactures another known desiccant air drying system. Hankison International also manufactures a combination refrigeration and desiccant drying system, using activated alumina.

Although the known units can be effective, they are often very costly, complex and/or require regular maintenance and replacement of parts. For example, many units utilize consumables, which must be monitored and replaced periodically. Some units contain moveable parts, which tend to wear more than fixed parts and result in shorter useful life for the device. Some known air-water separation devices require an independent source of power.

The cost of air-water separation devices also can be excessive. For example, a unit effective in removing approximately 80% of water vapor in compressed air can cost $300.00 and more, plus the cost of consumables. And, known lower priced air-water separation units are less effective in decreasing water vapor, removing as little as 20%, and many still require use and replacement of consumables. A mechanically simplistic and inexpensive alternative is needed.

BRIEF SUMMARY OF THE INVENTION

The present invention is a low cost, low maintenance integrated vapor extraction device, which uses a combination of Joule-Thomson expansion, e.g., adiabatic expansion of a gas, and a metal or other heat conductive surface to cause a decrease in the temperature of the subject compressed gas, thereby resulting in condensation of water vapor suspended therein onto a surface, which is positioned such that it directs the water condensing thereon into an area of the compressed gas tank where the extracted water can be drained or collected, and a method of use thereof.

BRIEF DESCRIPTION OF THE DRAWINGS

Preferred embodiments of the invention are described below with reference to the accompanying drawings, which are briefly described below.

DETAILED DESCRIPTION

FIGS. 1–4 illustrate an embodiment of the invention. The embodiment [100] includes the following: two inch in length and ½ inch in diameter threaded steel pipe [101], five inch long steel tube with a diameter of ½ inches on one end, which in the embodiment is attached to the two inch threaded pipe [101], and tapering down to a ¼ inch diameter on the opposite end [102], two inch by ½ inch reducing bushing [103]; five and ½ inch length of steel rod with ¼ inch diameter [104], an oval concave steel plate with a thickness of ¼ inch [105], and two steel strips which are two inch by ⅛ inch [106].

Figure 1:
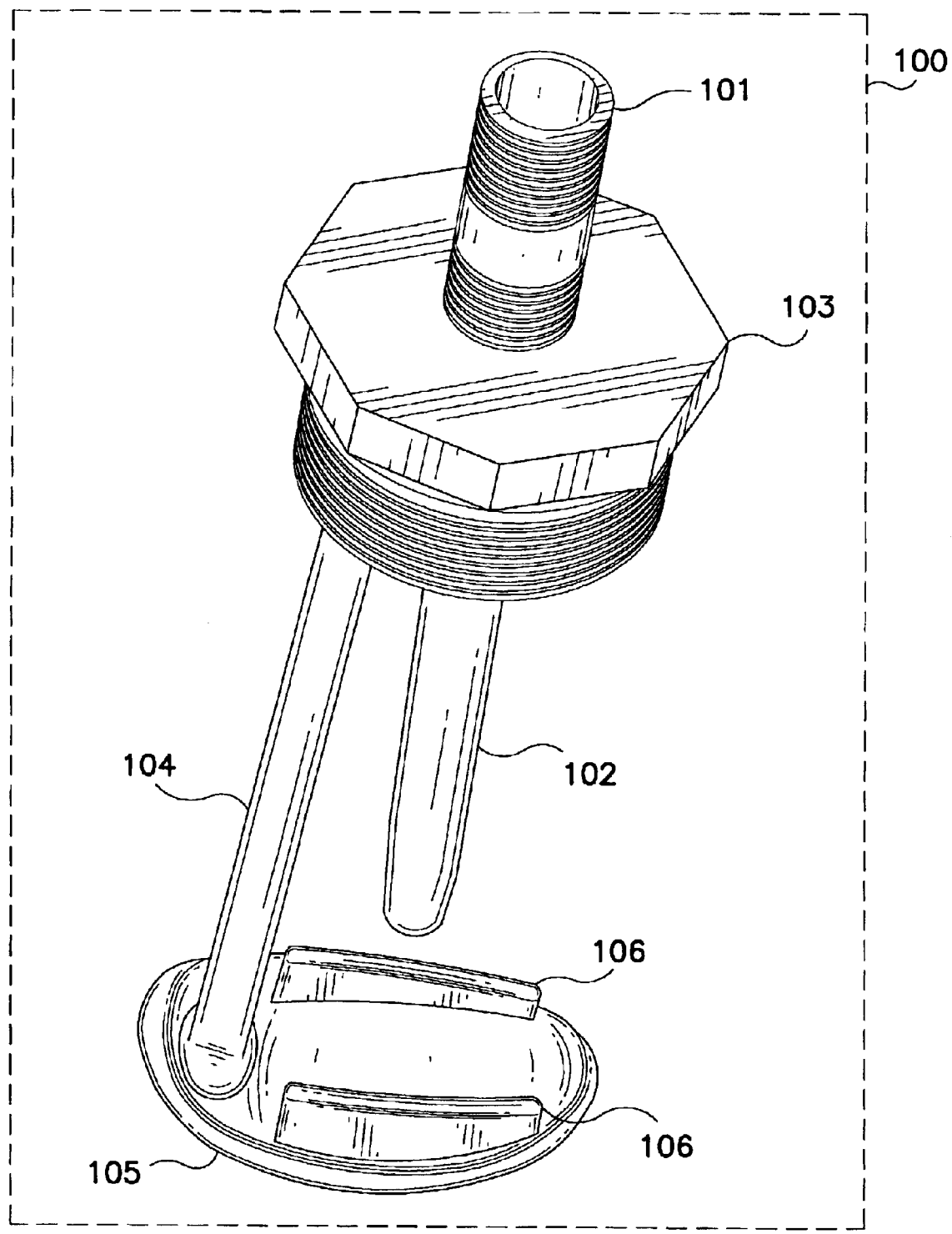
FIG. 1 is an overall perspective view of an embodiment of the invention.
Figure 2:
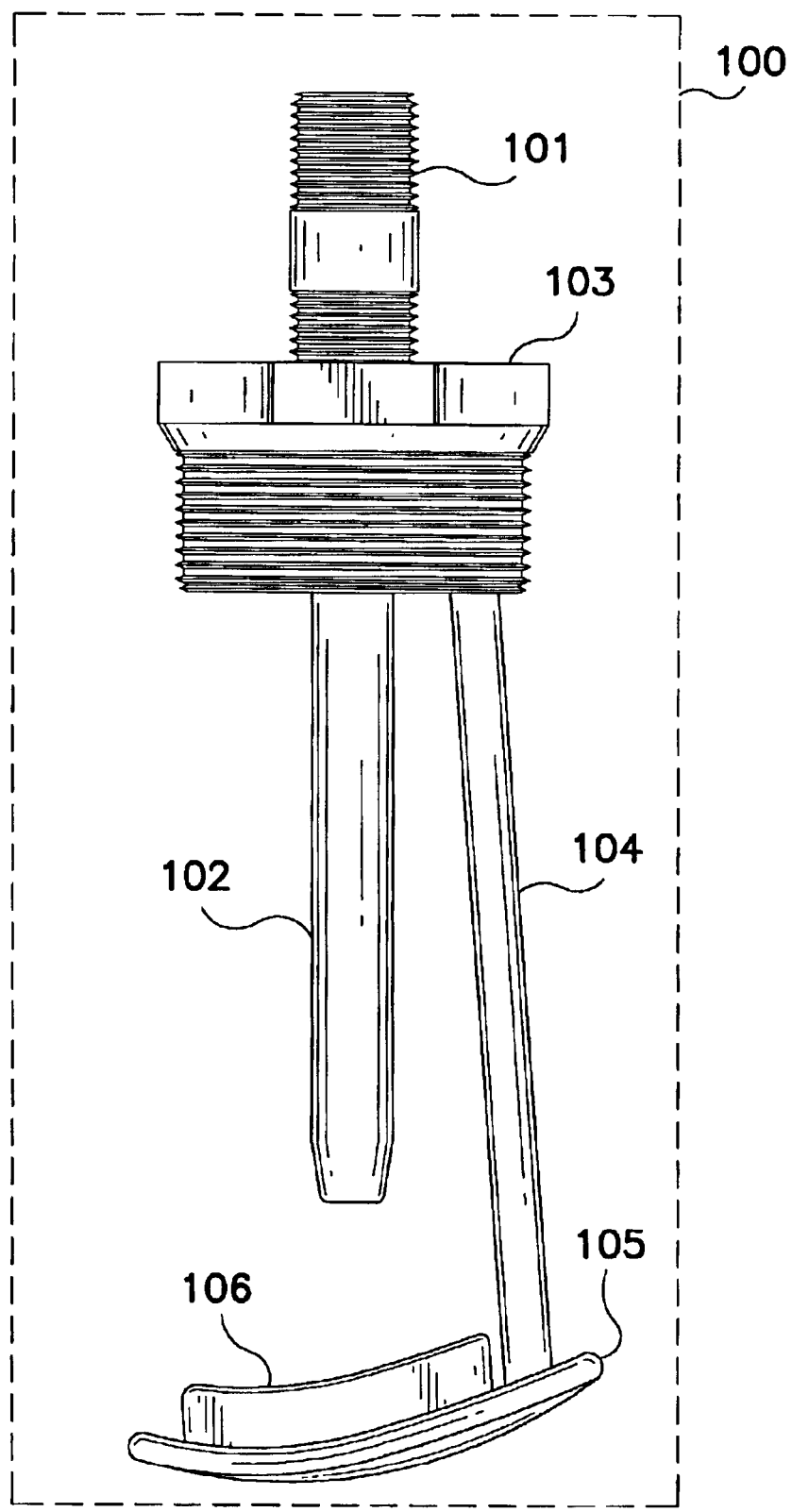
FIG. 2 is a lateral perspective view of an embodiment of the invention.
Figure 3:
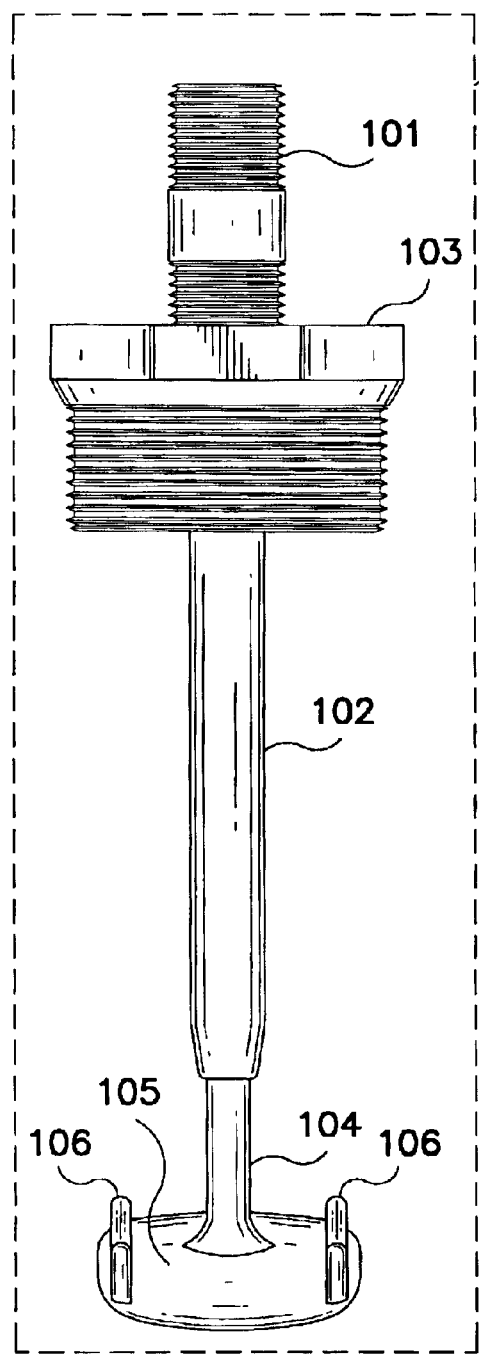
FIG. 3 is a bottom perspective view of an embodiment of the invention.
Figure 4:
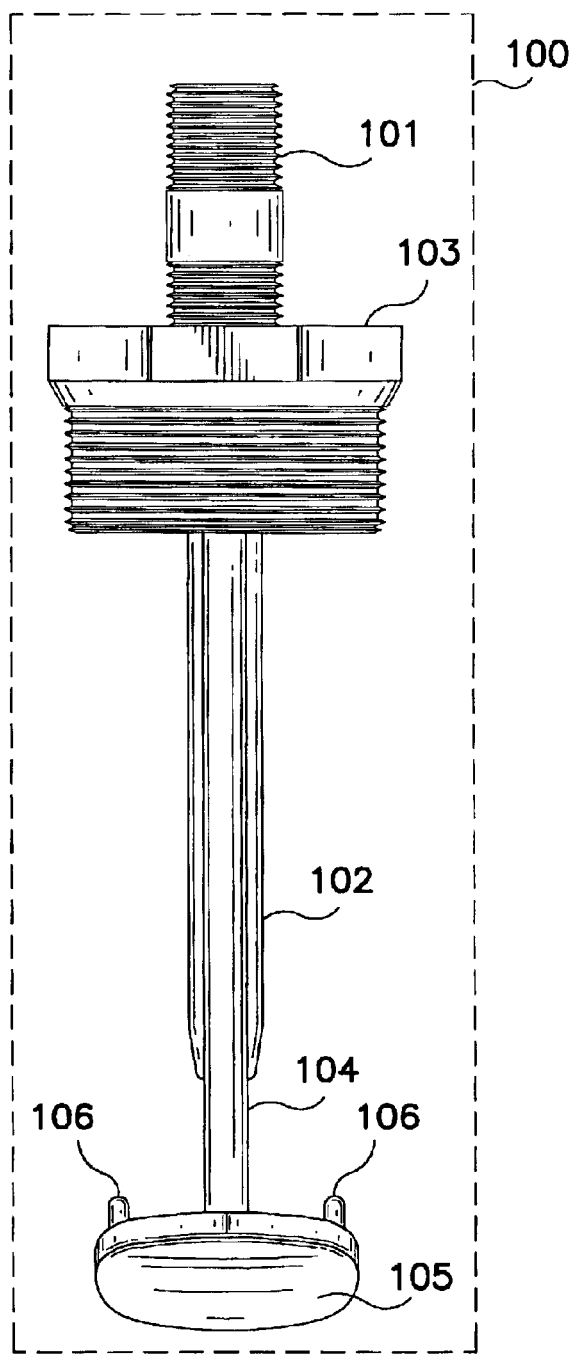
FIG. 4 is a top perspective view of an embodiment of the invention.

In the FIG. 1 illustrated embodiment, the components are affixed together by welding or threading. However, any means of securely affixing the components to each other is acceptable. The apparatus also could be manufactured as a single piece or some of the individual components listed above could be combined into a single component performing the same functions as the individual pieces.

It is not material to the invention to use a round rod [104] to affix the condensation plate [105] to the reducing bushing [103], and the location of the rod is not critical to performance of the invention, although placement on the bottom of the apparatus may interfere with water collection. Any means of affixing the condensation plate [105] to the reducing bushing [103] such that there is a gap between the end of the tapered tube [202] and the condensation plate [105] may be used. Additionally, instead of or in addition to using a tapered tube [102], one could use a venturi, such as a spring loaded venturi, to allow for variable gas flow. A non-tapered tube also could be used.

The invention may be used by attaching the apparatus to the air inlet on the compressor's main tank, but, for optimal performance, the apparatus should be installed downstream from the compressor's main tank, such as to the air inlet in a secondary tank, which is attached to the primary tank air outlet. The apparatus should be installed in a tank such that water condensing on the condensation plate [105] can exit the plate by gravity. Installation in a secondary tank will allow some cooling of the compressed gas before it encounters the apparatus, which typically should result in improved vapor extraction. The invention may be permanently affixed to the air inlet, such as by welding, but it is preferable to thread the apparatus into the air inlet to allow for removal and easier maintenance of the tank and apparatus.

In the invention, as the main compressor tank fills, the compressed gas is forced through the two inch threaded pipe [101], or into a secondary tank and then through the two inch threaded pipe [101], depending upon the chosen installation. The compressed air then is forced to exit the tapered end of the steel tube portion [102] of the apparatus where it cools as a result of Joule-Thomson expansion. The air or other gas then encounters the condensation plate [105] where it cools further as a result of contact with the metal, or other heat conductive, surface. As a result of cooling, water vapor suspended in the compressed air condenses on the concave face of the condensation plate [105] and then drips downward to the bottom of the tank from the force of gravity. The condensed water then can be drained from the tank as needed.

The embodiment depicted in FIG. 1 is believed to result in an 80% reduction in water vapor from compressed air when the ambient air temperature is 75–80° F. and the apparatus is installed in a tank secondary to the main compressor tank. However, this level of water vapor elimination is not a requirement of the invention. Elimination of as little as 20% of water vapor from a compressed gas still would be beneficial and sufficient for certain uses because of the relative low manufacturing cost of and minimal maintenance required to manufacture and operate the apparatus. Elimination of more than 80% of suspended water vapor may be achieved by the invention depending upon the subject compressed gas, the size of the condensation plate [105], the spacing between the tapered tube [102] and the condensation plate [105], the pressure of the subject compressed gas, the material used for the condensation plate, etc.

The overall dimensions of the apparatus and the dimensions of the individual components, as shown in FIG. 1, are not critical to the invention so long as the scale is maintained sufficiently to allow for some separation of water from compressed gas. For example, the plate [105] could be larger or smaller than depicted in FIG. 1 relative to the rest of the apparatus. The two inch threaded pipe [101] also could be made larger or smaller, with associated adjustment of the reducing bushing [103] and the diameter of the five inch tube [102]. The reducing bushing [103] also could be replaced with a component designed to serve the same function, which is to allow the apparatus to be easily mounted in the air inlet of a standard air compressor tank while forcing the compressed air to move through a more narrow opening to take advantage of the Joule-Thomson effect to further enhance vapor elimination. The threading on the ½ diameter pipe [102] is not essential, as welding or other attachment means could be used to affix the pipe to the reducing bushing [103], or its equivalent.

In another embodiment, the individual components of the invention may be made of other metals and/or polymer substances, which are strong and relatively inflexible, including materials with strength and flexibility characteristics similar to steel, and, with respect to the concave plate [105] and five inch tube [102], have the capacity to conduct heat away from the subject compressed gas. The material chosen should be non-reactive with the subject compressed gas. For example, stainless steel may be used for an environment which is sensitive to rust or corrosion.

In another embodiment of the invention, the two steel strips [106] may be removed, with or without additional concavity being added to the plate [105]. The degree of concavity of the plate and the shape of the condensation plate [105] are not critical to the invention, but for improved performance should be such that the condensation plate directs the water vapor condensing thereon to exit the plate towards the bottom. For example, the condensation plate could be square, oval, circular, rectangular, etc.

Although preferred embodiments of the invention have been described in detail, it will be understood by those skilled in the art that various modifications can be made therein without departing from the spirit and scope of the invention as set forth in the appended claims. The description herein is merely representative of the broad scope of the invention envisioned, and numerous variations of the above embodiments may be known or may become known or are obvious or may become obvious to one of ordinary skill in the art, and these variations are fully within the broad scope of the invention. For example, while the invention has been described in the context of a particular material, i.e., steel, other materials may be similarly used according to the teaching herein. And, while the invention is described as separate components attached together to make a single apparatus, it is not necessary to the invention that the individual components of the apparatus described herein ever exist as separate entities. Accordingly, the scope of the invention is to be limited only by the claims appended hereto, and equivalents thereof.

In the claims, a reference to an element in the singular is not intended to mean "one and only one" unless explicitly stated. Rather, the same is intended to mean "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present invention is intended to be dedicated to the public regardless of whether the element, component, or method step is explicitly recited in the claims.

No claim element herein is to be construed under the provisions of 35 U.S.C. §112, ¶6, unless the element is expressly recited using the phrase "means for".

We claim:

1. An apparatus for decreasing water vapor in compressed gas, comprising:
   (a) a length of tubing having an opening on both ends for compressed gas to flow in one end and out the other end;
   (b) a plate for condensing water vapor thereon;
   (c) a means of associating said plate and said length of tubing such that said plate is situated adjacent to and with a face of said plate facing towards one end of said length of tubing;
   (d) a reducing bushing connected to said tubing at the end opposite the end associated with said plate to allow said tubing to be connected to an opening larger than said tubing; and
   (e) a means for connecting said reducing bushing and said tubing.

2. An apparatus as set forth in claim 1, wherein said tubing is rigid.

3. An apparatus as set forth in claim 1, wherein said plate is concave and situated such that the concave surface is facing towards one end of said length of tubing.

4. An apparatus as set forth in claim 1, wherein said means of associating is a rod connected to said reducing bushing and to said plate.

5. An apparatus as set forth in claim 1, wherein said plate is made of heat conductive material.

6. An apparatus as set forth in claim 1, further comprising:
   (a) a barrier for directing water vapor condensing on said plate; and
   (b) a means for connecting said barrier to said plate.

7. An apparatus as set forth in claim 1, wherein:
   said tubing has a larger diameter on one end than on the other end, and the end with the smaller diameter is located closest to said plate.

8. An apparatus as set forth in claim 1, wherein:
   (a) said tubing has a larger diameter on one end than on the other end, and the end with the smaller diameter is located closest to said plate;
   (b) said plate is concave; and
   (c) said reducing bushing has an external diameter of two inches and an internal diameter of ½ inches.

9. An apparatus as set forth in claim 1, wherein:
   (a) said tubing comprises a two inch in length by ½ inch in diameter threaded pipe connected end to end to a five inch long steel tube with a diameter of ½ inches on the end attached to said threaded pipe and which tapers to ¼ inches in diameter on the opposite end;
   (b) a means for connecting said threaded pipe and said steel tube;
   (c) said plate is concave; and
   (d) said reducing bushing has an external diameter of two inches and an internal diameter of ½ inches.

10. A method of decreasing water vapor in compressed gas, which comprises the steps of:
    (a) attaching an apparatus to the inlet port of a container for storing compressed gasses such that the compressed gas must flow through said apparatus when entering the container and, wherein said apparatus comprises:
       a length of tubing having an opening on both ends for compressed gas to flow in one end and out the other end;
       a plate for condensing water vapor thereon;
       a means of associating said plate and said length of tubing such that said plate is situated adjacent to and with a face of said plate facing towards one end of said length of tubing;
       a reducing bushing connected to said tubing at the end opposite the end associated with said plate to allow said tubing to be connected to an opening larger than said tubing; and
       a means of connecting said reducing bushing and said tubing; and
    (b) forcing compressed gas through said tubing and onto said plate.

11. A method according to claim 10, wherein:
    (a) said tubing has a larger diameter on one end than on the other end, and the end with the smaller diameter is located closest to said plate;
    (b) said plate is concave; and
    (c) said reducing bushing has an external diameter of two inches and an internal diameter of ½ inches.

* * * * *